Patented Dec. 15, 1953

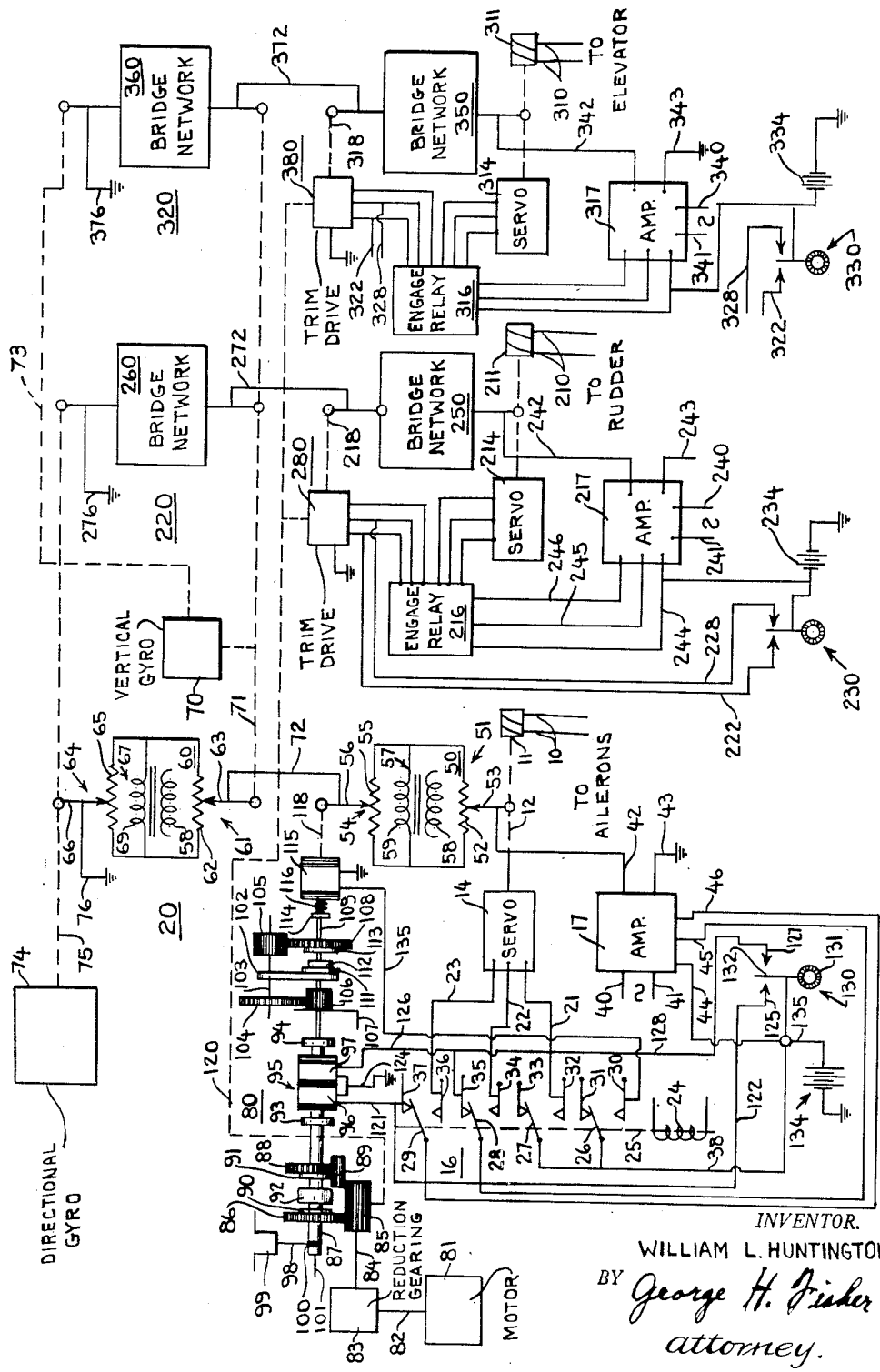

2,662,704

UNITED STATES PATENT OFFICE 2,662,704

AUTOMATIC PILOT

William L. Huntington, Minneapolis, Minn., assignor to Minneapolis-Honeywell Regulator Company, Minneapolis, Minn., a corporation of Delaware Application October 8, 1948, Serial No. 53,472

13 Claims. (Cl. 244—77)

This invention pertains to automatic control apparatus for dirigible craft which apparatus when applied to an aircraft is termed an automatic pilot.

This invention is an improvement in the type of automatic pilot disclosed in the United States application of John F. Schoeppel, Serial No. 567,254, filed December 8, 1944. In the aforesaid application of John F. Schoeppel, provision is made for operating the aileron, rudder, and elevator of an aircraft by individual servomotors. Each servomotor is operated by an amplifier which has a balanceable control circuit.

When the aircraft is manually flown, at which time the servos are disassociated from the control surfaces, each amplifier controls a centering motor which in turn drives means to rebalance the amplifier control circuit during any change in the attitude of the aircraft while it is under manual control. There is an individual centering motor for each of the three amplifier circuits.

It is an object of this invention to provide in such aforesaid automatic pilot a single centering motor common to the three amplifier circuits thereby reducing the number of motors required.

It is a further object of this invention to provide in such aforesaid automatic pilot a single motor and a plurality of gear trains selectively connectible with said motor, each gear train being associated with an amplifier input circuit.

A further object of this invention is to provide for manual control of said gear trains and motor connection while said automatic pilot controls an aircraft.

A further object of this invention is to provide for a change of gear ratios in said gear train when said automatic pilot controls an aircraft.

These and further objects of the invention will be evident upon consideration of the accompanying description and drawing disclosing a preferred embodiment of the invention.

The sole figure is a schematic arrangement of the improved automatic pilot.

Referring to the drawing, there is disclosed therein an arrangement for operating the ailerons, rudder, and elevator of an aircraft whereby three axis control of the aircraft is provided. The ailerons (not shown) are connected to cables 10 extending from a cable drum 11 which is supported by a shaft 12. The shaft 12 is operatively connected to an aileron servomotor 14. The servomotor 14 is operatively controlled by an aileron amplifier 17 through an aileron engaged relay 16.

The amplifier 17 is controlled by a balanceable network 20. The control network 20 is itself operated by a directional gyro 74, a vertical gyro 70, a centering and trim drive 80, and a rebalancing drive 12 operated by the aileron servomotor 14.

The servomotor 14 reversibly positions the cable drum 11. The aileron servomotor 14 may be of the type disclosed in an application of Willis H. Gille, Serial No. 447,989, filed June 22, 1942, or like that disclosed in a patent to Willis H. Gille et al. 2,425,733. Extending from the aileron servomotor is a brake energizing lead 21, a one rotation clutch lead 22, and an opposite rotation clutch lead 23.

The aileron engaged relay has an operating coil 24 and a plunger 25 associated therewith. Operably associated with said plunger are four pivoted single pole double throw single break switch arms 26, 27, 28, and 29. Associated with the switch arms are contacts having the designated functions. Coacting with switch arm 26 is an in centering drive gear train contact 30 and an inoperative out contact 31. Coacting with switch arm 27 is an in servo brake solenoid contact 32 and an inoperative out contact 33. Coacting with switch arm 28 is an in servomotor one clutch coil contact 34 and an out one rotation centering drive contact 35. Coacting with switch arm 29 is an in other servomotor clutch contact 36 and an out opposite centering drive rotation contact 37.

The amplifier 17 is provided with power input connections 40, 41 which may be connected to the ship's supply. The amplifier 17 additionally includes signal input connections 42, 43 which are connected to the input control network 20; D. C. supply lead 44, left relay lead 45 and right relay lead 46. The amplifier 17 may be of the type disclosed in the aforesaid patent to W. H. Gille et al. or that disclosed in the aforesaid application of Willis H. Gille. Such amplifier has a pair of relays alternatively operated dependent on the phase of a control signal across connections 42, 43. A relay is continuously or intermittently operated dependent on the magnitude of a control signal. Associated with the two relays are conductors or leads 45, 46. In such an arrangement either relay lead 45 or 46 is energized depending upon the phase relationship between the voltage across the power input leads 40, 41 and that across the signal input leads 42, 43.

The network 20 includes a variable impedance bridge network 50 and a variable impedance bridge network 60. The bridge network 50 includes a rebalancing potentiometer 51 having a resistor 52 and a slider 53; a centering-trim drive potentiometer 54 having a resistor 55 and a slider 56; and a transformer 57 having a primary winding 58 and a secondary winding 59. Resistor 52 is connected across the secondary winding 59 of the transformer 59. Slider 53 is operatively driven from the servomotor shaft 12 of aileron servomotor 14. Resistor 55 is connected across the secondary winding 59 in parallel with resistor 52. Slider 56 is operatively driven by a centering and trim drive gear train 80. Connection 42 extends from amplifier 17 to slider 53 of the rebalancing potentiometer 51.

Bridge network 60 includes a vertical gyro banking potentiometer 61 having a resistor 62 and a slider 63; a directional gyro aileron potentiometer 64 comprising a resistor 65 and a slider 66; and a transformer 67 comprising a primary winding 58 and a secondary winding 69. Since in the several networks the transformer secondary windings may have a common primary winding, the primary winding is indicated by the same reference character 58. Resistor 62 is connected across the ends of secondary winding 69. The slider 63 is adjusted by the vertical gyro 70 through an operative connection 71. The vertical gyro 70 is of the type whose rotor rotates about a vertical axis and is supported about two horizontal axes which are respectively perpendicular to each other. The vertical gyro may be of the type disclosed in the aforesaid application of Willis H. Gille, 447,939. The vertical gyro 70 is so arranged in the aircraft that upon movement of the aircraft about the roll axis the slider 63 is moved with respect to its resistor 62 by means of the vertical gyro 70. A lead connection 72 extends from slider 63 to slider 56 of potentiometer 54. The resistor 65 of potentiometer 64 is connected across the secondary winding 69 in parallel with resistor 62. The slider 66 is adjusted by a directional gyro 74 by a suitable operating connection 75. The directional gyro is of the type well known in the art whose rotor is mounted for rotation about a horizontal axis and is so supported that it may also rotate about a horizontal axis at right angles to its spin axis. In addition the rotor is supported so that it may rotate about a vertical axis. The directional gyro 74 is so mounted in the aircraft that the vertical axis is parallel with the vertical or turn axis of the aircraft. Upon movement of the aircraft about the turn axis due to changes in heading of the aircraft the directional gyro 74 will adjust the slider 66 with respect to resistor 65. A lead connection 76 extends from slider 66 to ground. The input circuit network is completed to the grounded lead 43 of amplifier 17.

As previously stated, the slider 56 of potentiometer 54 is operated by an aileron trim and centering drive 80 which is alternatively controlled with servomotor 14 by amplifier 17. The trim and centering drive 80 is powered by a motor 81 which may be either a D. C. or an A. C. motor of suitable type. The motor 81 through its shaft 82 drives a reduction gearing 83. The speed reduction gearing 83 through its output shaft 84 drives a broad pinion 85. In mesh with the broad pinion 85 is a gear 86 loosely supported on a hollow shaft 87. Also loosely carried by shaft 87 is a gear 88 which has a rotation opposite that of the gear 86 being for this purpose driven from the pinion 85 through a reversing gear 89. The gears 86 and 88 may be suitably supported against axial movement on the hollow shaft 87 by means not shown. The gears 86 and 88 carry opposed clutch faces 90 and 91 respectively. Carried by said hollow shaft 87 is a clutch member 92 which is interposed between the clutch elements 90 and 91 for association therewith. The hollow shaft 87 carries two spaced armature pieces 93 and 94. Wound concentric with the hollow shaft 87 and interposed between the armatures 93 and 94 is a differential operating coil 95. The differential coil 95 includes a coil 96 which coacts with armature 93 and a coil 97 which coacts with armature 94 whereby the shaft 87 is axially moved so that the clutch element 92 is associated with or engages either the clutch face 90 of gear 86 or the clutch face 91 of gear 88. Shaft centralizing means illustrated as a flat spring 98 is carried by a bracket 99. The spring 98 extends into a circumferential slot 100 in hollow shaft 87. The spring 98 tends to maintain shaft 87 centralized so that the clutch element 92 centralized with respect to the clutch faces 90 and 91.

A solid shaft 101 supports the hollow shaft 87. The shaft 101 and the shaft 87 may be keyed together by suitable splines (not shown). The shaft 101 carries a differential arm 102. A shaft 103 is journalled in the free end of arm 102. Fixed to one end of shaft 103 is a gear 104 and fixed to the opposite end of said shaft is a gear 105. Gear 104 meshes with a fixed gear 106 carried by a fixed bracket 107. The gear 105 meshes with a gear 108. The gear 108 is rotatably carried by a second hollow shaft 109. A clutch face 111 is carried by one side of differential arm 102. An opposing clutch face 113 is carried by the gear 108. Interposed between the clutch faces 111 and 113 is a clutched element 112 carried by the hollow shaft 109. The hollow shaft 109 carries an armature 114 which coacts with a coil 115. The coil 115 is concentric with the hollow shaft 109. The shaft 109 is splined or keyed to a second solid shaft 118 and is axially movable with respect thereto. Upon energization of the coil 115, the armature 114 is attracted toward said coil and moves the clutch element 112 into engagement with the clutch face 113 on gear 108. When the coil 115 is deenergized, a spring 116 interposed between the coil 115 and armature 114 tends to move the clutch element 112 to the left whereby it is engaged with the clutch face 111 carried by the differential arm 102. The solid shaft 118 carries the slider 56 and for purposes of illustration in the drawing the slider has been rotated, as in similar instances, through an angle of 90 degrees into the main projection plane.

A trim drive which in the instance described begins with the gears 86 and 89 and terminates in shaft 118 is duplicated in the rudder and elevator channels of the automatic pilot. In other words each trim drive in the rudder and elevator networks has a pair of gears corresponding with gears 86 and 89 of the aileron trim drive which mesh with the broad pinion 85 and a terminal shaft corresponding with shaft 118. This engagement of the corresponding gears with the driving pinion 85 is indicated by an operative connection 120.

The coils 96 and 97 of differential coil 95 have an input connection 121 and 126 respectively and a common ground connection 124. The connection 121 extends to the out contact 37 of aileron engaged relay 16 and through a branch lead 122 to a contact 125 of a manually operable switch 130. The connection 126 extends to an operative out contact 35 of engaged relay 16 and through a branch connection 128 to a contact 127 of switch 130.

The manually operable switch 130 includes a manually operable knob 131 which carries a switch blade 132 intermediate contacts 125, 127. A lead 135 extends from switch blade 132 to a battery 134. The opposite side of the battery is connected to ground. A lead 38 extends from the battery 134 to the switch arms 26 and 27 of the aileron engage relay 16.

The operating coil 115 of trim drive 80 has one side connected through a lead 135 to in contact 30 of aileron engage relay 16. The opposite side of the coil 115 is connected to ground.

The rudder and elevator channels of the automatic pilot have been illustrated in block diagrams for purpose of simplicity. The aileron channel of the automatic pilot has been described in detail. The rudder and elevator channels have components which have their counterpart in the aileron channel. These counterparts will be pointed out, and it is considered that the operativeness of the rudder and elevator channels will therefore be apparent.

The rudder channel includes cables 210 extending from the rudder servomotor cable drum 211. This drum 211 is driven by a rudder servomotor 214 corresponding with the servomotor 14 of the aileron channel. The rudder servomotor 214 is controlled by a rudder amplifier 217 through a rudder engage relay 216. The amplifier 217 and rudder engage relay 216 corresponding with the amplifier 17 and the engage relay 16 of the aileron channel. The rudder amplifier 217 has an input network circuit 220 corresponding with the input circuit 20 of the aileron amplifier 17. This circuit 220 includes a bridge network 260 corresponding with the bridge 60 in the aileron channel and a bridge network 250 corresponding with the bridge 50 of the aileron channel.

The bridge network 260 includes a directional gyro rudder potentiometer whose slider is operated from the directional gyro 74 by operating means 75 in response to course deviations and a vertical gyro rudder compensating potentiometer operated by means 75 from the vertical gyro 70 in response to roll deviations.

The bridge network 250 includes a trim and centering potentiometer driven by a rudder trim drive 280 alternatively controlled with servomotor 214 by amplifier 217 and corresponding with the trim drive 80 of the aileron channel and also a servo balance potentiometer whose slider is operated from the rudder servomotor shaft extending from servomotor 214. The rudder channel includes a manually operable switch 230 corresponding with the switch 130 of the aileron channel. A manually operable switch 230 may be used to additionally control trim drive 280 over that provided by amplifier 217.

The elevator channel includes a servo drum 311 which operates cables 310 extending to the elevator (not shown). Cable drum 311 is operated from the elevator servomotor 314 which corresponds with the servomotor 14 of the aileron channel. The elevator amplifier 317 alternatively controls a trim drive 380 or the servomotor 314 through the elevator engage relay 316. The elevator amplifier 317 is controlled by a control circuit which includes a bridge network 360 and a bridge network 350.

The bridge network 350 includes a vertical gyro pitch potentiometer whose slider is operated through operating means 73 from vertical gyro 70 upon movement of the aircraft about the pitch axis. The network 360 includes a vertical gyro up elevator potentiometer whose slider is operated through connection 71 from the vertical gyro 70 upon movement of the aircraft about the roll axis.

The bridge network 350 includes a centering and trim drive potentiometer whose slider is operated by the trim drive 380 and a servo balance potentiometer whose slider is operated from the servomotor 314.

In addition to being automatically controlled by the amplifier 317 through the engage relay 316, the trim drive 380 may be also controlled from a manually operable switch 330. The leads which extend from the manually operable switch 330 to the coils of the differential coil in trim drive 380 are shown in discontinuous form for ease of illustration.

Having completed a detailed description of the components of the apparatus and their interrelationship, the operation of the apparatus will be considered in connection with the flight of an aircraft in which it may be considered to be installed.

Consider initially the operation of the amplifier and its control network. By referring to the drawing, it is evident that the input circuit of each channel amplifier includes two networks in the form of a Wheatstone bridge. With respect to the aileron amplifier input circuit, the bridge 60 has output elements thereof consisting of the sliders 63 and 66. With respect to the bridge 50 the output elements are the sliders 53 and 56. Normally the sliders are all at the electrical centers of their respective resistors at which time there is no differential of potential between the output elements of either bridge.

Should the aircraft change its heading, the slider 66 will be moved by the directional gyro depending on direction of deviation toward one or the other ends of resistor 65 whereby a differential of potential will exist across the sliders 63 and 66. Such difference of potential, when the autopilot is engaged, will cause the operation of the amplifier 17 and the servomotor 14 whereby the slider 53 will be positioned until the potential difference between sliders 53 and 56 is equal and opposite to that between sliders 63 and 66 with the result that the input circuit of amplifier 17 is balanced.

On the other hand when the aircraft is being manually controlled in which case the control surfaces are directly manually actuated, the aileron, rudder, and elevator engage relays are in the out position. In the out position, as shown in detail in the aileron channel, the amplifier output connections 45 and 46 are connected to the switch arms 28 and 29 and out contacts 35 and 37 and leads 126 and 121 to the coils 97 and 96 of differential coil 95 respectively.

If the pilot should manually move the ailerons, he simultaneously moves the slider 53 by rotating the drum 11 through cables 10. The slider 53 in its adjusted position is at a potential different from that of slider 56 of potentiometer 54. The input circuit of aileron amplifier 17 is now unbalanced.

If the slider 53 be moved toward the left, the input circuit of amplifier 17 will be so unbalanced as to cause the operation of the relay connected to lead 45. D. C. voltage is now extended from the battery 134, through lead 44, to the connection 45, the switch arm 28, out contact 35, lead 126, coil 97, lead 124 to ground, and to the grounded side of battery 134. The coil 97 as thus energized attracts the armature 94 and thus the hollow shaft 87. The movement of the shaft is thus toward the left bringing the clutch element 92 into engagement with the clutch face 90 of gear 86.

Since the gear 86 is being driven by the pinion 85 the shaft 87 will be rotated and will also rotate the solid shaft 101 splined thereto. The solid shaft 101 as stated carries the differential arm 102 bearing the clutch face 111. In the out position of relay 16 the coil 115 is unenergized, consequently the hollow shaft 109 with its clutch element 112 is toward the left as shown in the drawing whereby motion of the differential arm is directly transmitted to the clutch element 112 and through the spline connection of the shaft 109 bearing the clutch element 112 to the solid shaft 118 which operates the slider 156. The slider 56 is moved toward the left to balance the amplifier input circuit.

As the aircraft banks under the manually applied aileron, the vertical gyro 70 operates the slider 63 of the banking potentiometer 61 to reverse the phase of unbalance of amplifier 17. The slider 56 is again positioned by the aileron trim drive 80 but in a reverse direction to maintain the input circuit of aileron amplifier 17 in balanced condition.

The movement of the vertical gyro 70 in response to the banking of the aircraft also causes the gyro 70 to displace the slider in the rudder network 260 and a slider of the up elevator potentiometer in elevator bridge network 360. In the rudder channel, the rudder trim drive 280 is controlled by the amplifier 217 which had had its input circuit unbalanced by the vertical gyro 70 to effect rebalancing of the input circuit of amplifier 217.

In the elevator channel the operation of the slider in the up elevator potentiometer causes the unbalance of the input circuit of amplifier 317. The amplifier 317 operates and causes the elevator trim drive 360 to operate the slider associated therewith in network 350 to rebalance the input circuit of amplifier 317.

It is thus apparent that as the aircraft moves about the roll axis due to the manual operation of the ailerons, which movement results in the unbalance of the input circuit of the aileron, the rudder, and the elevator amplifiers, that such input circuits are again rebalanced by the operation of the aileron trim drive 80, the rudder trim drive 280, and the elevator trim drive 380.

It is further believed apparent that if the ailerons be initially manually moved and the slider 53 be also moved to unbalance the amplifier input circuit, that the coil 96 of relay 95 will be energized whereby the shaft 87 with its armature 93 is moved toward the right causing the clutch element 92 to engage the clutch face 91 of gear 88. Gear 88 is driven in the opposite direction from gear 86 by means of intermediate pinion 89 interposed between gear 88 and the driving pinion 85. The shaft 87 which now rotates in the opposite direction also drives the shaft 101 in the opposite direction. The differential arm 102 which has its clutch face 111 engaged with the clutch element 112 drives the shaft 109 and through it the solid shaft 118 and slider 56. The slider 56 is moved to rebalance the input circuit. The ailerons cause banking of the aircraft to reverse the phase of unbalance of the input of amplifier 17 and also cause the vertical gyro 70 to operate a slider in the bridge network 260 and a slider in the network 360 in the opposite direction from the first banking movement of the aircraft. In a similar manner to that obtained before, the aileron amplifier 17, the rudder amplifier 217, and the elevator amplifier 317 will effect operation of their trim drives 80, 280, and 380 respectively to maintain the input circuits of aileron amplifier 17, rudder amplifier 217, and elevator amplifier 317 in a balanced condition.

It is believed that the operation of the slider of the servo balance potentiometer in network 350 when the elevators are manually controlled and the subsequent operation of the trim drive 380 and that of the vertical gyro pitch potentiometer and network 360 is apparent from a description of the operation of the aileron channel upon manual movement of the ailerons.

In like manner the operation of a rudder manually will cause initially the unbalancing of the input circuit of the rudder amplifier 17 with consequent operation of rudder trim drive 280 and subsequently the directional gyro 74 will unbalance the input circuits of rudder and aileron amplifiers 17, 217 with the subsequent operation of their trim drives 280 and 80 to rebalance the input circuits of the respective amplifiers.

Under manual operation of the control surfaces therefor, the trim drives in each channel at all times operate their respective sliders to maintain the input circuits of the aileron, rudder, and elevator amplifiers in a balanced condition irrespective of the changed attitude of the aircraft.

We may now assume that the aircraft is to be automatically stabilized on a desired heading and is in a level position with respect to the roll and pitch axes. At this time the sliders 66 of the aileron compensating potentiometer 64 and that of the directional gyro rudder potentiometer are at the mid points of their respective resistors. Similarly the slider 63 of the vertical gyro bank potentiometer 61 and the slider in the rudder network 260 operated by gyro 70 and the slider in network 360 operated by the vertical gyro 70 on roll deviations are in the mid positions of their respective resistors. Similarly the slider in bridge network 360 positioned by the vertical gyro 70 upon movement of the aircraft about the pitch axis is also at the electrical center of its respective resistor. The aircraft is assumed to be so trimmed that all of the sliders in each amplifier control network are at the electrical centers of their respective resistors with the plane in the attitude stated. The control surfaces at this time are in their normal position.

The engage relays 16, 216, and 316 are considered to be operated at which time they assume the in position. The aileron servomotor 14, the rudder servomotor 214, and the elevator servomotor 314 are now in brake position with respect to their respective control surfaces and maintain such surfaces in a locked position.

The aircraft is automatically maintained on the desired heading and at the desired attitude by directional gyro 74 and the vertical gyro 70 through their control of certain of the bridge elements. For example if the aircraft tends to alter its course to the left from the desired heading, the directional gyro 74 will move the slider 66 of the aileron potentiometer 64 toward the left and the slider in the directional gyro rudder potentiometer in network 260 toward the left. This movement produces unbalance in the input circuits of amplifier 17 and 217 causing the aileron servomotor 14 and the rudder servomotor 214 to operate their sliders to rebalance the amplifier input circuits and position the ailerons and rudder. As the aircraft banks due to the applied ailerons, the vertical gyro 70 operates the slider 63 of the vertical gyro banking potentiometer 61, a slider in rudder bridge network 260 and a slider in bridge network 360. The signals from the vertical gyro 70 in the network 60 and 260 cause the ailerons and rudder to be moved back toward normal position. The vertical gyro signal in network 360 causes the application of up elevator.

As the aircraft approaches a desired heading, the directional gyro 74 moves slider 66 of the directional gyro aileron potentiometer 64 and the slider of the directional gyro rudder potentiometer in network 260 back to their normal position. This unbalances the input circuits of amplifier 17 and 217 causing the servomotors 14 and 214 to be reversely rotated thereby applying opposite aileron and rudder.

Due to the opposite aileron, the bank in the aircraft decreases. The decrease vertical gyro signal in the networks 60 and 260 due to the lessening of the bank with the movement of the sliders controlled by the vertical gyro 70 back toward their normal position causes the ailerons and rudder to be moved toward normal position. In addition the reverse movement of the slider in the up elevator potentiometer of network 360 causes the elevator to be moved back toward normal position.

The action as described is continuous in that as the aircraft approaches its normal position the bank of the aircraft decreases and the control surfaces are moved back toward normal position. When the aircraft has regained its heading, the gyro operated sliders are again at the normal position on their resistors.

When the aircraft deviates toward the opposite direction from that originally stated, a similar operation of the directional gyro potentiometers in networks 60 and 260 occurs with the sliders being moved initially in the opposite direction due to the opposite deviation. It is believed that the subsequent operation of the servomotors 14 and 214 resulting from this movement, and the effect of the vertical gyro 70 on the operation of the aileron, rudder, and elevator will be apparent from reference to the first considered course deviation operation. As before the directional gyro initiates decrease in the bank angle.

The automatic stabilization of the aircraft with respect to the roll and pitch axes will be evident to one skilled in the art in view of the described operation of the aileron network during course deviations.

The operations of the trim drives 80, 280, and 380 have been considered when they were performing what is known as a centering operation or a rebalancing operation. These trim drives may also be manually operated to initiate changes in trim of the aircraft by causing initiating signals in the control circuits of the amplifier 17, 217, and 317. This operation will now be considered.

When the engage relays are operated the coils in the trim drives corresponding with coil 115 of the aileron trim drive are energized. The operation of all of the trim drives is analogous to aileron trim drive 80. With coil 115 energized, the armature 114 is attracted to thereby cause the clutch element 112 to engage the clutch face 113 of gear 108. The gear 108 is thereby driven through an epicyclic gear train so that the shaft 108 and consequently the slider 56 is adjusted at a slower speed from the shaft 101.

If it be desired to change the trim of the aircraft about the roll axis, the pilot may operate the manually adjustable knob 131 to engage either contact 125 or 127. The direction in which the trim of the craft is to be altered will determine which contact 125, 127 is engaged by the switch blade 132. If contact 125 be engaged by the switch blade 132, the circuit is completed from battery 134, lead 135, switch blade 132, contact 125, lead 122, lead 121, coil 96, to ground, and to the grounded side of battery 134. Coil 96 is thus energized and attracts armature 93 on shaft 87. Shaft 87 carries the clutch element 92 which is now drivingly engaged with the clutch face 91 on gear 88. Gear 88 drives the hollow shaft 87 and the solid shaft 101. From the shaft 101 rotation is communicated through the differential arm 102 and the epicyclic gear train to the shaft 109 and thence to shaft 118 which operates the slider 56. As slider 56 is operated from the trim drive, its potential with respect to that of slider 53 of the rebalancing potentiometer 51 alters. The input circuit of amplifier 17 is unbalanced, and the amplifier 17 causes the operation of the servomotor 14 which positions the ailerons and also operates the slider 53 to rebalance the input circuit.

Under the applied ailerons as adjusted by the servomotor 14, the aircraft begins to move about its roll axis. The vertical gyro 70 responds to this roll and operates the slider 63 of the aileron banking potentiometer 61. As the aircraft tends to increase its banked position due to the applied ailerons, the vertical gyro 70 causes the slider 63 to move along resistor 62 to unbalance the input circuit of aileron amplifier 17. This unbalance is of the opposite direction than that provided by the adjustment of slider 56 of the trim drive. The ailerons are therefore moved in an opposite direction by the servomotor 14 since the amplifier input circuit has had its balance upset in an opposite direction. The ailerons are thus moved back toward a normal position.

When the pilot considers that the aircraft has changed its trim about the roll axis a sufficient amount he moves the switch blade 132 to its mid position shown. The slider 56 is thus no longer adjusted by the trim drive and remains in its assumed position. The ultimate positions of the sliders 63 and 56 of the vertical gyro aileron banking potentiometer and the aileron trim drive potentiometer and that of slider 53 of the servo potentiometer are such that they set up balancing signals in the input circuit of aileron amplifier 17. The servo balance potentiometer wiper 53 has been moved back short of the center position on its resistor 52.

The tilt of the aircraft about the roll axis whereby a resulting movement has been applied to slider 63 from vertical gyro 70 has also caused the displacement of the slider in network 260 of the rudder bridge network. The rudder amplifier 217 has its input circuit unbalanced and it operates its servomotor 214 to position the rudder and to set up a balancing signal in network 250. The displaced rudder tends to maintain the heading of the aircraft which would otherwise tend to change heading due to displacement of the ailerons of the aircraft.

When the pilot desired to change trim in the opposite direction about the roll axis he rotates the knob 131 to cause the switch blade 132 to engage contact 127 whereby the coil 97 becomes energized to move the armature 94 and shaft 87 toward the left whereby the clutch element 92 is engaged with the clutch face 90 on gear 86. The slider 56 will be moved in an opposite direction to cause the opposite positioning of the ailerons so that the proper trim of the aircraft is obtained. As before the vertical gyro 70 causes an unbalance in the input circuit of the rudder aileron amplifier 217 and the rudder is positioned to offset any tendency of the aircraft to turn or change its course due to the displaced ailerons which provide its new trim position about the roll axis.

In a similar way the turn axis trim control 230 may be operated to change the heading of the plane with respect to its turn axis. This alteration in heading may be effected in either direction with respect to the stabilized position about the turn axis which is maintained by the directional gyro 74.

Also the elevator trim control 330 may be operated to change the attitude of the aircraft about the pitch axis in either direction as desired.

Reverting to the aileron trim drive which is particularly illustrated, it is proposed to amplify the purpose in providing the two speed drive for the slider 56 of the potentiometer 54. In amplifiers of the type disclosed in the aforesaid application of Willis H. Gille, 447,989, and also in the patent to Willis H. Gille et al. 2,425,733, the amplifier operates intermittently for small signals which occur as the input circuit of the amplifier approaches a balanced condition. This intermittent operation of the amplifier causes automatic intermittent operation of the slider 56 when the aircraft control surfaces are being manually operated or intermittent operation of the slider 53 of the rebalancing potentiometer 51 when the aircraft is on automatic pilot. The intermittent operation of the amplifier as the balance point is approached tends to prevent overshooting of either slider 56 or 53 when the aircraft is manually operated or automatically controlled.

With manual control of the trim drive through the control 130, however, there is no intermittent operation of the slider 56 as the aircraft approaches its desired trim condition. In order that the pilot may have finer adjustment of the slider 56 by means of the motor 81 and its driven elements a lower ratio of gears is provided by the energization of coil 115 so that the rate of positioning of this slider 56 is decreased. It is possible then for the pilot to open the circuit between switch blade 132 and contact 125 or contact 127 when the desired trim position of the aircraft has been reached without any appreciable overrunning of the desired control point by the slider 56. A coarse and fine adjustment of the slider 56 is therefore provided by the change speed gear described.

It is now evident that there has been disclosed an improved centering arrangement for the input control circuits of a plurality of amplifiers in an automatic pilot wherein a single driving element automatically controls the operation of a plurality of centering devices in such control circuits and that such arrangement also provides for manual control of the position of such devices by means of the driving element at a reduced continuous speed to change the trim of the aircraft.

I claim as my invention:

1. Control apparatus for an aircraft comprising: motor means for altering the attitude of the aircraft about the turn, roll, and pitch axes; control means for each motor means, each control means including a balanceable circuit; position sensitive means for each circuit; operable means in each circuit for maintaining its control means balanced during attitude changes of said craft while said motor means is inoperative; a motor driven means normally operatively disengaged with all said operable means; and means controlled by each control means on unbalance thereof for effecting the operative engagement of its operable means with said motor driven means.

2. Control apparatus for an aircraft comprising: power means for operating a control surface on said aircraft; means for disabling said power means from operating said surface control means for said power means including a balanceable circuit, said control means being operative on unbalance of said circuit; means for unbalancing said circuit upon change in attitude of said aircraft; means for rebalancing said circuit by said power means; a motor means; means including variable motion transmission means rendered effective by said control means and operated by said motor means at a normal speed during attitude changes of said craft, while said power means is inoperative, to rebalance said circuit; and manual means for controlling operation of said motion transmission means by said motor means at a reduced speed while said power means is operative.

3. Control apparatus for an aircraft comprising: power means for operating a control surface on said craft; control means for said power means including a balanceable network having a plurality of signal generators and a signal combining means; means responsive to tilt for operating one signal generator to unbalance said network; means driven by said power means to operate a second signal generator to rebalance said network; means for connecting or disconnecting said power means from said control means; a third signal generator; gear transmission means including a normal and a low gear train responsive to said control means while said power means is disconnected from said control means for operating said third generator by said normal train; and manual means for controlling said transmission means and said third signal generator through said low gear train while said power means is connected.

4. Control apparatus for an aircraft comprising: power means for controlling the attitude of the craft about the turn, roll, and pitch axes; a control means for operating the power means for each axis and each control means including a balanceable network; means responsive to change in attitude of said craft about said axis for unbalancing said network to initiate operation of said control means; means driven by said power means for rebalancing said network; a motor; a plurality of change speed transmission means driven by said motor, one transmission means being associated with each network; means for affecting the balance of a network and operated by said transmission means; means for connecting or disconnecting said power means with said control means; means included in each transmission means and responsive to said control means when said power means is disconnected therefrom for causing operation at one speed of said balance affecting means; and manually operable means for controlling said included means for causing operation of said balance affecting means at another speed when said power and control means are connected.

5. Control apparatus for an aircraft having control surfaces for controlling the attitude of the craft about the turn, roll, and pitch axes said apparatus comprising: a power means adapted to be operatively connected or disconnected with each axis control surface; a plurality of control means comprising a control means for each power means, each control means including a balanceable circuit; means responsive to tilt about each axis for unbalancing said control means circuits; means driven by said power means for rebalancing said circuits while said power means and control surfaces are operatively connected; a motor, a plurality of gear trains connectable with said motor, means controlled by each control means while its power means is disconnected from its control surface for connecting an associated gear train with said motor, and means driven by each gear train for affecting the balance of the circuit of its associated control means.

6. Control apparatus for an aircraft having control surfaces for controlling the attitude of the craft about a plurality of axes said apparatus comprising: a power means for each axis control surface and adapted to be connected or disconnected therefrom; a control means for each power means and including a balanceable network; means for unbalancing each network; means driven by a connected power means for rebalancing its network; a motor; a plurality of gear trains adapted to be associated or disassociated with said motor; means responsive to a control means while its power means is disconnected from a control surface to associate said motor and a gear train; and means driven by said gear train for affecting the balance of said control means network.

7. Control apparatus for an aircraft having control surfaces for controlling the attitude of the craft about a plurality of axes said apparatus comprising: a power means for each axis control surface and adapted to be connected or disconnected therefrom; a control means for each power means and including a balanceable network; means for unbalancing each network; means driven by a connected power means for rebalancing its network; a motor; a plurality of gear trains adapted to be associated or disassociated with said motor; means responsive to a control means while its power means is disconnected from a control surface to associate said motor and a gear train; means driven by said gear train for affecting the balance of said control means network; and manually operable means for controlling said responsive means while said power means is connected for altering the trim of the craft about an axis.

8. Control apparatus for an aircraft having control surfaces for controlling the attitude of the craft about a plurality of axes said apparatus comprising: a power means for each axis control surface and adapted to be connected or disconnected therefrom; a control means for each power means and including a balanceable network; means for unbalancing each network; means driven by a connected power means for rebalancing its network; a motor; a plurality of gear trains adapted to be operatively associated or disassociated with said motor; means responsive to a control means while its power means is disconnected from a control surface to operatively associate said motor and a gear train; means driven by said gear train for affecting the balance of said control means network; means for changing the ratio of said gear train when said power means is connected with its surface; and manually operable means for controlling said responsive means while said power means is connected.

9. A motor control system comprising: a plurality of pairs of controllers each pair comprising a main controller and a rebalancing controller; an individual power means for each pair of controllers and connected to its rebalancing controller; a control means for each power means each control means being actuated by the unbalance between a main controller and rebalancing controller and connected with its power means to reduce said unbalance; a motor; an adjusting means for each control means to shift the point of unbalance between a main controller and a rebalancing controller at which said control means will cause said power means to operate; and means for selectively connecting each adjusting means with said motor.

10. A motor control system comprising: a plurality of pairs of controllers each pair comprising a main controller and a rebalancing controller; an individual power means for each pair of controllers and connected to its rebalancing controller; a control means for each power means each control means being actuated by the unbalance between the main controller and rebalancing controller and connectable with its power means to reduce said unbalance; a motor; an adjusting means for each control means to shift the point of unbalance between a main controller and a rebalancing controller at which said control means will cause said power means to operate; means for operatively associating each adjusting means with said motor; and means for alternatively connecting each said control means with its power means or with said associating means.

11. Control apparatus comprising; a plurality of amplifiers; a control circuit for each amplifier; means for unbalancing each circuit; means for rebalancing each circuit; a connectible drive means for each rebalancing means; a motor; and means controlled by each amplifier on unbalance of its control circuit for effecting connection of said motor and connectible drive means to cause operation of a rebalancing means by said motor to terminate operation of said amplifier.

12. Control apparatus for a dirigible craft comprising: power means for controlling the attitude of said craft about an axis; control means for operating said power means including a balanceable network having signal generating and combining means; means responsive to tilt about an axis for operating a signal generator to unbalance said network to initiate operation of said control means; means for disabling the operation of said power means by said control means; a constantly energized motor, clutch means controlled by said control means upon tilt of said craft while said power means is inoperative for operating a second signal generator from said motor at a normal speed to rebalance said network; and manual means for effecting operation of said second signal generator through said clutch from said constantly energized motor at another than said normal speed when said power means is operative by said control means.

13. In control apparatus for a dirigible craft having power means for controlling the attitude of the craft about an axis, control means for said power means including an amplifier having a balanceable control circuit and operating alternatively in accordance with the direction of circuit unbalance a pair of control relays, the energization of a relay being intermittent or continuous dependent on the extent of unbalance of the control circuit, said circuit containing a plurality of signal generators and signal combining means, in combination: means rendering said power means inoperative by said control means; means responsive to tilt of said craft for operating one signal generator in said circuit; means driven by said power means to operate a second generator in said circuit; a third generator in said circuit; motor operated means responsive to closing of a relay of said control means for operating said third generator at a speed dependent on relay closing duration upon tilt of said craft while said power means is inoperative by said control means; and manual controlled means for operating said third signal generator from said motor operated means at a lower speed than provided by said relay closing continuously when said power means is operative.

WILLIAM L. HUNTINGTON.

References Cited in the file of this patent

UNITED STATES PATENTS

| Number | Name | Date |
|---|---|---|
| 2,415,429 | Kellogg et al. | Feb. 11, 1947 |
| 2,429,642 | Newton | Oct. 28, 1947 |

FOREIGN PATENTS

| Number | Country | Date |
|---|---|---|
| 819,170 | France | July 5, 1937 |